United States Patent
Birang et al.

[11] Patent Number: 5,875,559
[45] Date of Patent: Mar. 2, 1999

[54] APPARATUS FOR MEASURING THE PROFILE OF A POLISHING PAD IN A CHEMICAL MECHANICAL POLISHING SYSTEM

[75] Inventors: Manoocher Birang, Los Gatos; Arnold Aronsen, San Francisco, both of Calif.

[73] Assignee: Applied Materials, Inc., Santa Clara, Calif.

[21] Appl. No.: 549,540

[22] Filed: Oct. 27, 1995

[51] Int. Cl.[6] .................................. G01B 5/20; G01B 7/28
[52] U.S. Cl. ............................................... 33/553; 33/554
[58] Field of Search ........................... 33/553, 1 M, 503, 33/504, 533, 549, 551, 554, 555

[56] References Cited

U.S. PATENT DOCUMENTS

| | | | |
|---|---|---|---|
| 4,265,022 | 5/1981 | Noguchi et al. | 33/553 |
| 5,068,972 | 12/1991 | Herzog et al. | 33/549 |
| 5,189,806 | 3/1993 | McMurtry et al. | 33/553 |
| 5,617,645 | 4/1997 | Wick et al. | 33/551 |

*Primary Examiner*—Christopher W. Fulton
*Attorney, Agent, or Firm*—Fish & Richardson

[57] ABSTRACT

A pad profiler has a three-point mount support the profiler above a polishing pad. A slider assembly is supported on a guide, and a sensor is connected to the slider assembly and positioned over a diametric segment of the polishing pad. The profiler uses a lead screw to drive the slider assembly across the polishing pad. The advantages of the invention include the measurement of the thickness of polishing pad to optimize polishing process parameters or to select a conditioning process. Additional advantages include stable support of the profiler over the pad, and smooth motion of the sensor along a radius of the pad.

21 Claims, 16 Drawing Sheets

APPARATUS FOR MEASURING THE PROFILE OF A POLISHING PAD IN A CHEMICAL MECHANICAL POLISHING SYSTEM

CROSS REFERENCE TO RELATED APPLICATIONS

This application is related to concurrently filed U.S. Application entitled CONTINUOUS PROCESSING SYSTEM FOR CHEMICAL MECHANICAL POLISHING, U.S. Ser. No. 08/549,336, now U.S. Pat. No. 5,738,574, and assigned to the assignee of the present application. The entire disclosure of that application is hereby incorporated by reference.

BACKGROUND OF THE INVENTION

The invention relates to chemical mechanical polishing of substrates, and more particularly to an apparatus for measuring the profile of a polishing pad.

Integrated circuits are typically formed on substrates, particularly silicon wafers, by the sequential deposition of conductive, semiconductive or insulative layers. After each layer is deposited, the layer is etched to create circuitry features. As a series of layers are sequentially deposited and etched, the outer or uppermost surface of the substrate, i.e., the exposed surface of the substrate, becomes successively more non-planar. This occurs because the distance between the outer surface and the underlying substrate is greatest in regions of the substrate where the least etching has occurred, and least in regions where the greatest etching has occurred. With a single patterned underlying layer, this non-planar surface comprises a series of peaks and valleys wherein the distance between the highest peak and the lowest valley may be the order of 7000 to 10,000 Angstroms. With multiple patterned underlying layers, the height difference between the peaks and valleys becomes even more severe, and can reach several microns.

This non-planar outer surface presents a problem for the integrated circuit manufacturer. If the outer surface is non-planar, then photolithographic techniques to pattern photoresist layers might not be suitable, as a non-planar surface can prevent proper focusing of the photolithography apparatus. Therefore, there is a need to periodically planarize this substrate surface to provide a planar layer surface. Planarization, in effect, polishes away a non-planar, outer surface, whether a conductive, semiconductive, or insulative layer, to form a relatively flat, smooth surface. Following planarization, additional layers may be deposited on the outer layer to form interconnect lines between features, or the outer layer may be etched to form vias to lower features.

Chemical mechanical polishing is one accepted method of planarization. This planarization method typically requires that the substrate be mounted on a carrier or polishing head, with the surface of the substrate to be polished exposed. The substrate is then placed against a rotating polishing pad. In addition, the carrier head may rotate to provide additional motion between the substrate and polishing surface. Further, a polishing slurry, including an abrasive and at least one chemically-reactive agent, may be spread on the polishing pad to provide an abrasive chemical solution at the interface between the pad and substrate.

Important factors in the chemical mechanical polishing process are: the finish (roughness) and flatness (lack of large scale topography) of the substrate surface, and the polishing rate. Inadequate flatness and finish can produce substrate defects. The polishing rate sets the time needed to polish a layer. Thus, it sets the maximum throughput of the polishing apparatus.

Each polishing pad provides a surface which, in combination with the specific slurry mixture, can provide specific polishing characteristics. Thus, for any material being polished, the pad and slurry combination is theoretically capable of providing a specified finish and flatness on the polished surface. The pad and slurry combination can provide this finish and flatness in a specified polishing time. Additional factors, such as the relative speed between the substrate and pad, and the force pressing the substrate against the pad, affect the polishing rate, finish and flatness.

Because inadequate flatness and finish can create defective substrates, the selection of a polishing pad and slurry combination is usually dictated by the required finish and flatness. Given these constraints, the polishing time needed to achieve the required finish and flatness sets the maximum throughput of the polishing apparatus.

An additional limitation on polishing throughput is "glazing" of the polishing pad. Glazing occurs when the polishing pad is heated and compressed in regions where the substrate is pressed against it. The peaks of the polishing pad are pressed down and the pits of the polishing pad are filled up, so the surface of the polishing pad becomes smoother and less abrasive. As a result, the polishing time required to polish a substrate increases. Therefore, the polishing pad surface must be periodically returned to an abrasive condition, or "conditioned", to maintain a high throughput.

An additional consideration in the production of integrated circuits is process and product stability. To achieve a low defect rate, each successive substrate should be polished under similar conditions. Each substrate should be polished by approximately the same amount so that each integrated circuit is substantially identical.

In view of the foregoing, there is a need for a chemical mechanical polishing apparatus which optimizes polishing throughput, flatness, and finish, while minimizing the risk of contamination or destruction of any substrate.

Specifically, there is a need for an apparatus for measuring the profile of a polishing pad to determine the thickness uniformity of the polishing pad. Such an apparatus should be reliable, sturdy, and accurate.

Additional advantages of the invention will be set forth in the description which follows, and in part will be obvious from the description, or may be learned by practice of the invention. The advantages of the invention may be realized by means of the instrumentalities and combinations particularly pointed out in the claims.

SUMMARY OF THE INVENTION

In one embodiment, the present invention is an apparatus for measuring the profile of a polishing pad in a chemical mechanical polishing system comprising. A mount supports a guide which is aligned substantially parallel with a surface of a platen which supports the polishing pad. A slide assembly moves along the guide, and an arm extends from the slide assembly and holds a sensor over a radial segment of the polishing pad.

Implementations of the invention include the following. The sensor may be a linear variable differential transformer. The mount may include three feet to rest on the polishing pad. A motor may rotate a lead screw which is positioned parallel to the guide and extends through a threaded passage in the slide assembly.

BRIEF DESCRIPTION OF THE DRAWINGS

The accompanying drawings, which are incorporated in and constitute a part of the specification, schematically illustrate a preferred embodiment of the invention, and together with the general description given above and the detailed description of the preferred embodiment given below, serve to explain the principles of the invention.

DESCRIPTION OF THE PREFERRED EMBODIMENT(S)

Figure 1A:
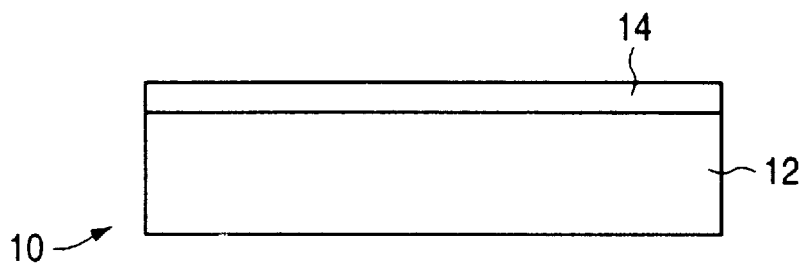
FIGS. 1A–1E are schematic diagrams illustrating the deposition and etching of a layer on a substrate.
Figure 1B:
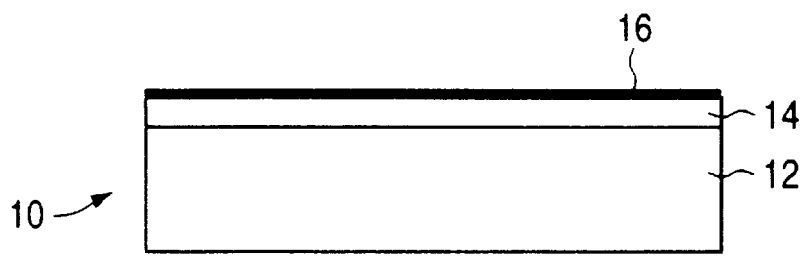
Figure 1C:
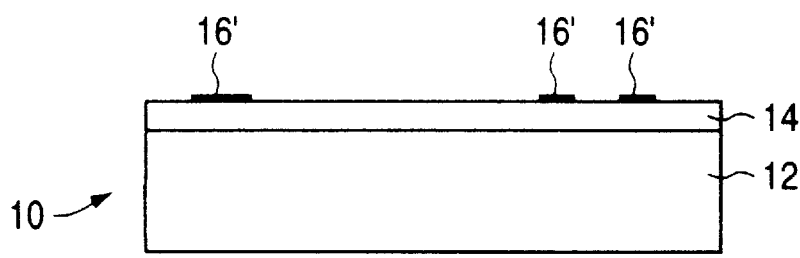
Figure 1D:
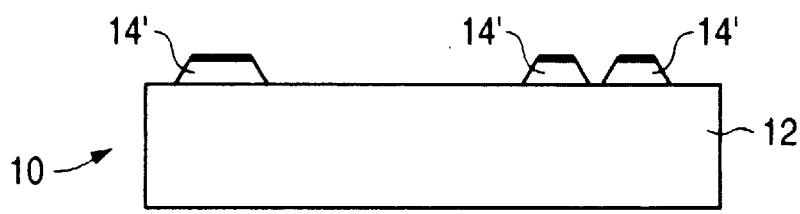
Figure 1E:
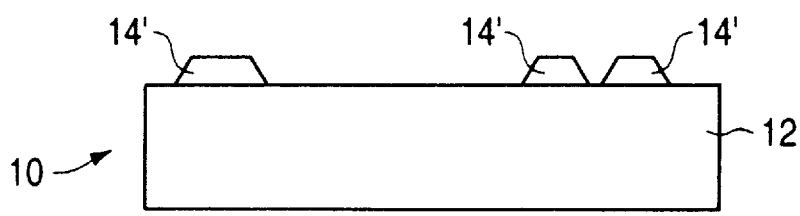

FIGS. 1A–1E illustrate the process of depositing a layer onto a planar surface of a substrate. As shown in FIG. 1A, a substrate 10 might be processed by coating a flat semiconductive silicon wafer 12 with a metal layer 14, such as aluminum. Then, as shown in FIG. 1B, a layer of photoresist 16 may be placed on metal layer 14. Photoresist layer 16 can then be exposed to a light image, as discussed in more detail below, producing a patterned photoresist layer 16' shown in FIG. 1C. As shown in FIG. 1D, after patterned photoresist layer 16' is created, the exposed portions of metal layer 14 are etched to create metal islands 14'. Finally, as shown in FIG. 1E, the remaining photoresist is removed.

Figure 2A:
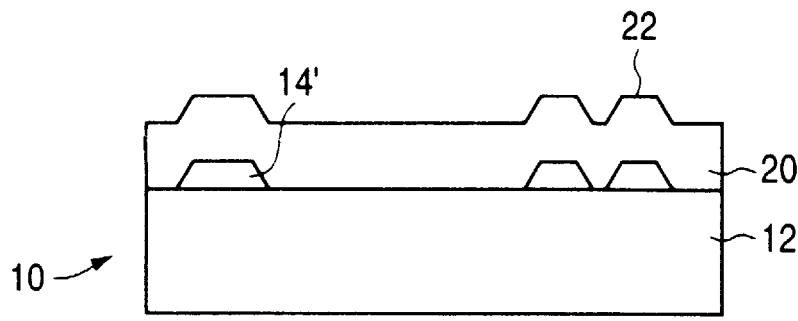
FIGS. 2A–2C are schematic diagrams illustrating the polishing of a non-planar outer surface of a substrate.
Figure 2B:
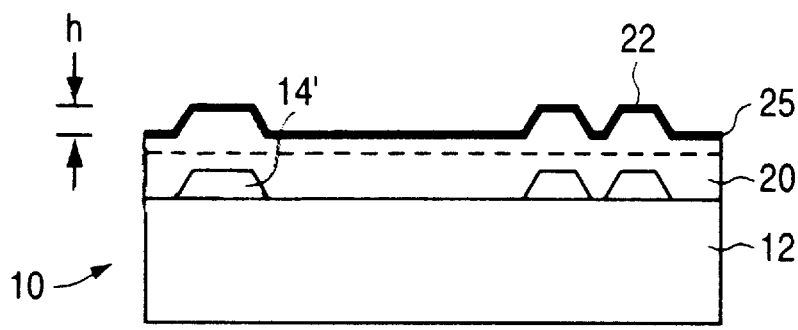

FIGS. 2A–2B illustrate the difficulty presented by deposition of subsequent layers on a substrate. As shown in FIG. 2A, an insulative layer 20, such as silicon dioxide, may be deposited over metal islands 14'. The outer surface 22 of insulative layer 20 almost exactly replicates the underlying structures of the metal islands, creating a series of peaks and valleys so outer surface 22 is non-planar. An even more complicated outer surface would be generated by depositing and etching multiple layers on an underlying patterned layer.

If, as shown in FIG. 2B, outer surface 22 of substrate 10 is non-planar, then a photoresist layer 25 placed thereon is also non-planar. A photoresist layer is typically patterned by a photolithographic apparatus that focuses a light image onto the photoresist. Such an imaging apparatus typically has a depth of focus of about 0.2 to 0.4 microns for sub-halfmicron feature sizes. If the photoresist layer 25 is sufficiently non-planar, that is, if the maximum height difference h between a peak and valley of outer surface 22 is greater than the depth of focus of the imaging apparatus, then it will be impossible to properly focus the light image onto the entire surface 22. Even if the imaging apparatus can accommodate the non-planarity created by a single underlying patterned layer, after the deposition of a sufficient number of patterned layers, the maximum height difference will exceed the depth of focus.

It may be prohibitively expensive to design new photolithographic devices having an improved depth of a focus. In addition, as the feature size used in integrated circuits becomes smaller, shorter wavelengths of light must be used, resulting in further reduction of the available depth of focus.

Figure 2C:
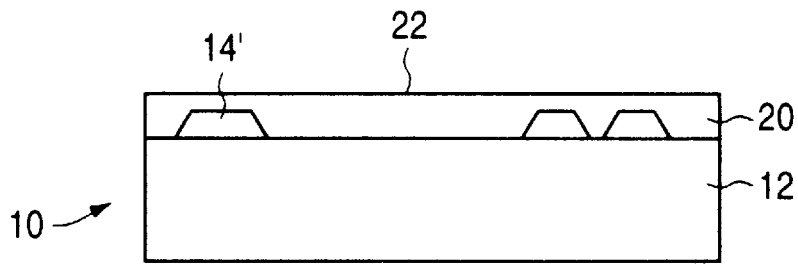

A solution, as shown in FIG. 2C, is to planarize the outer surface. Planarization wears away the outer surface, whether metal, semiconductive, or insulative, to form a substantially smooth, flat outer surface 22. As such, the photolithographic apparatus can be properly focused. Planarization could be performed only when necessary to prevent the peak-to-valley difference from exceeding the depth of focus, or planarization could be performed each time a new layer is deposited over a patterned layer.

Polishing may be performed on metallic, semiconductive, or insulative layers. The particular reactive agents, abrasive particles, and catalysts will differ depending on the surface being polishing. The present invention is applicable to polishing of any of the above layers.

Figure 3:
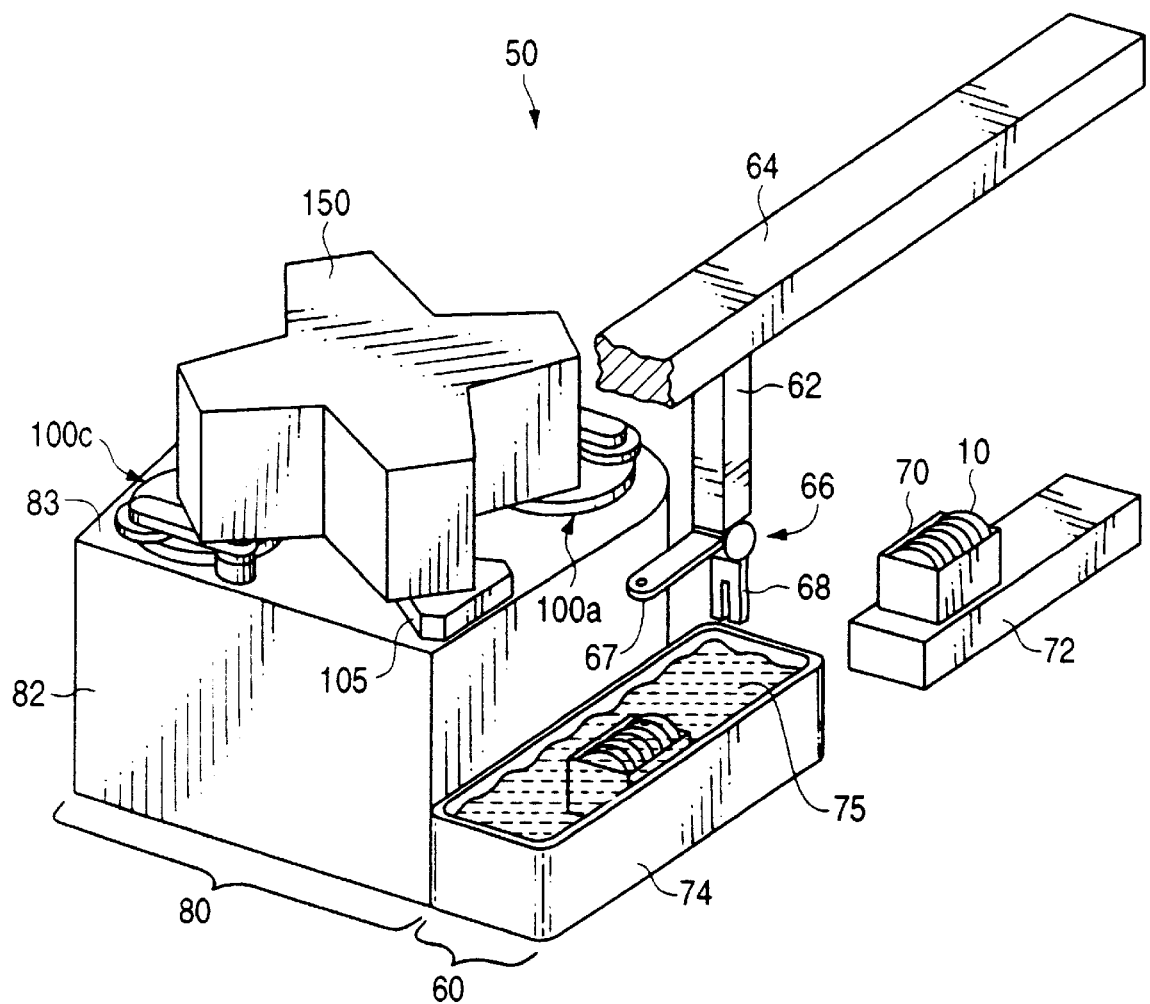
FIG. 3 is a schematic perspective view of a chemical mechanical polishing apparatus.

As shown in FIG. 3, a chemical mechanical polishing system 50 according to the present invention includes a loading apparatus 60 adjacent to a polishing apparatus 80. Loading apparatus 60 includes a rotatable, extendable arm 62 hanging from an overhead track 64. In the figure, overhead track 64 has been partially cut-away to more clearly show polishing apparatus 80. Arm 62 ends in a wrist assembly 66 which includes a blade 67 with a vacuum port and a cassette claw 68.

Substrates 10 are brought to polishing system 50 in a cassette 70 and placed on a holding station 72 or directly into a tub 74. Cassette claw 68 on arm 64 may be used to grasp cassette 70 and move it from holding station 72 to tub 74. Tub 74 is filled with a liquid bath 75, such as deionized water. Blade 67 fastens to an individual substrate from cassette 70 in tub 74 by vacuum suction, removes the substrate from cassette 70, and loads the substrate into polishing apparatus 80. Once polishing apparatus 80 has completed polishing the substrate, blade 67 returns the substrate to the same cassette 70 or to a different one. Once all of the substrates in cassette 70 are polished, claw 68 may remove cassette 70 from tub 74 and return the cassette to holding station 72.

Figure 4:
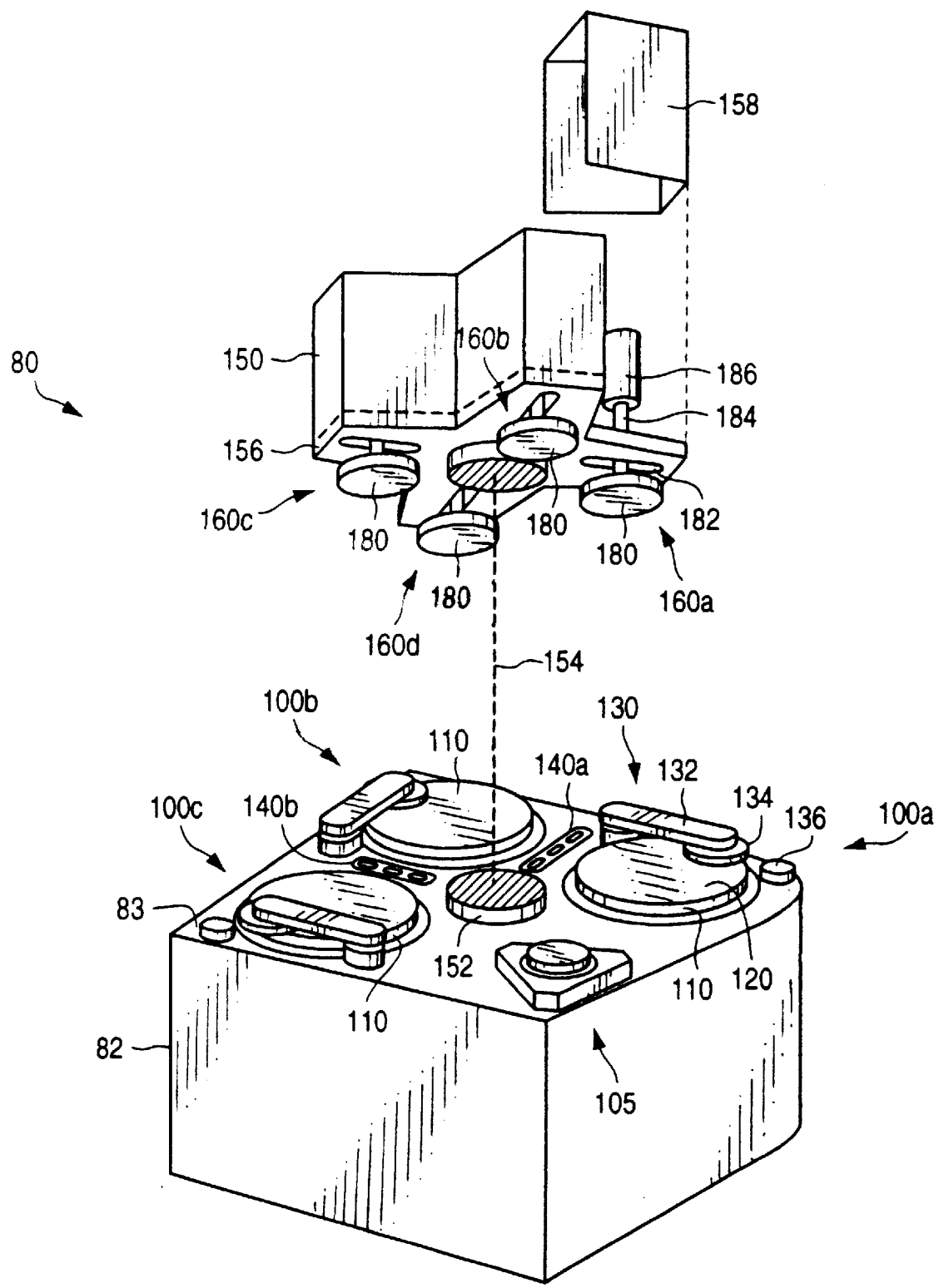
FIG. 4 is a schematic exploded perspective view of the chemical mechanical polishing apparatus of FIG. 3.

Polishing apparatus 80 includes a lower machine base 82 with a table top 83 mounted thereon and removable upper outer cover (not shown). As best seen in FIG. 4, table top 83 supports a series of polishing stations 100a, 100b and 100c, and a transfer station 105. Transfer station 105 forms a generally square arrangement with the three polishing stations 100a, 100b and 100c. Transfer station 105 serves multiple functions of receiving individual substrates 10 from loading apparatus 60, washing the substrates, loading the substrates into carrier heads (to be described below), receiving the substrates from the carrier heads, washing the substrates again, and finally transferring the substrates back to loading apparatus 60 which returns the substrates to the cassette.

Each polishing station 10a, 100b, or 100c includes a rotatable platen 110 on which is placed a polishing pad 120. Each polishing station 10a, 100b and 10c may further include an associated pad conditioner apparatus 130. Each pad conditioner apparatus 130 has a rotatable arm 132 holding an independently rotating conditioner head 134 and an associated washing basin 136. The conditioner apparatus maintains the condition of the polishing pad so it will effectively polish any substrate pressed against it while it is rotating.

Two or more intermediate washing stations 140a and 140b are positioned between neighboring polishing stations 10a, 100b, 100c and transfer station 105. The washing stations rinse the substrates as they pass from one polishing station to another.

A rotatable multi-head carousel 150 is positioned above lower machine base 82. Carousel 150 is supported by a center post 152 and rotated thereon about a carousel axis 154 by a carousel motor assembly located within base 82. Center post 152 supports a carousel support plate 156 and a cover 158. Multi-head carousel 150 includes four carrier head systems 160a, 160b, 160c, and 160d. Three of the carrier head systems receive and hold a substrate, and polish it by pressing it against the polishing pad 120 on platen 110 of polishing stations 100a, 100b and 100c. One of the carrier head systems receives substrates from and delivers substrates to transfer station 105.

In the preferred embodiment, the four carrier head systems 160a–160d are mounted on carousel support plate 156 at equal angular intervals about carousel axis 154. Center post 152 supports carousel support plate 156 and allows the carousel motor to rotate the carousel support plate 156 and to orbit the carrier head systems 160a–160d, and the substrates attached thereto, about carousel axis 154.

Each carrier head system 160a–160d includes a polishing or carrier head 180. Each carrier head 180 independently rotates about its own axis, and independently laterally oscillates in a radial slot 182 formed in support plate 156. A carrier drive shaft 184 connects a carrier head rotation motor 186 to carrier head 180 (shown by the removal of one-quarter of cover 158). There is one carrier drive shaft and motor for each head.

The substrates attached to the bottom of carrier heads 180 may be raised or lowered by the polishing head systems 160a–160d. An advantage of the overall carousel system is that only a short vertical stroke is required of the polishing head systems to accept substrates, and position them for polishing and washing. An input control signal (e.g., a pneumatic, hydraulic, or electrical signal), causes expansion or contraction of carrier head 180 of the polishing head systems in order to accommodate any required vertical stroke. Specifically, the input control signal causes a lower carrier member having a wafer receiving recess to move vertically relative to a stationary upper carrier member.

During actual polishing, three of the carrier heads, e.g., those of polishing head systems 160a–160c, are positioned at and above respective polishing stations 100a–100c. Each rotatable platen 110 supports a polishing pad 120 with a top surface which is wetted with an abrasive slurry. Carrier head 180 lowers a substrate to contact polishing pad 120, and the abrasive slurry acts as the media for both chemically and mechanically polishing the substrate or wafer.

After each substrate is polished, polishing pad 120 is conditioned by conditioning apparatus 130. Arm 132 sweeps conditioner head 134 across polishing pad 120 in an oscillatory motion generally between the center of polishing pad 120 and its perimeter. Conditioner head 134 includes an abrasive surface, such as a nickel-coated diamond surface. The abrasive surface of conditioner head 134 is pressed against rotating polishing pad 120 to abrade and condition the pad.

In use, the polishing head 180, for example, that of the fourth carrier head system 160d, is initially positioned above the wafer transfer station 105. When the carousel 150 is rotated, it positions different carrier head systems 160a, 160b, 160c, and 160d over the polishing stations 10a, 100b and 10c, and the transfer station 105. The carousel 150 allows each polishing head system to be sequentially located, first over the transfer station 105, and then over one or more of the polishing stations 100a–100c, and then back to the transfer station 105.

Figure 5A:
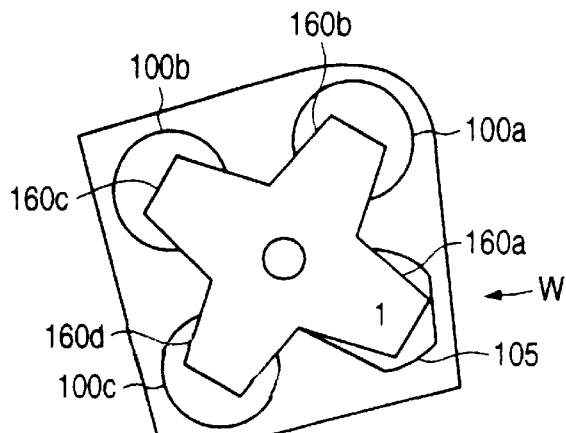
FIGS. 5A–5F are schematic top views of the polishing apparatus illustrating the progressive movement of wafers as they are sequentially loaded and polished.
Figure 5B:
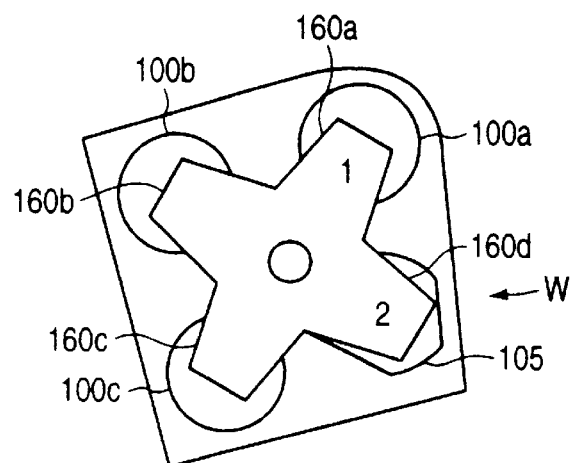
Figure 5C:
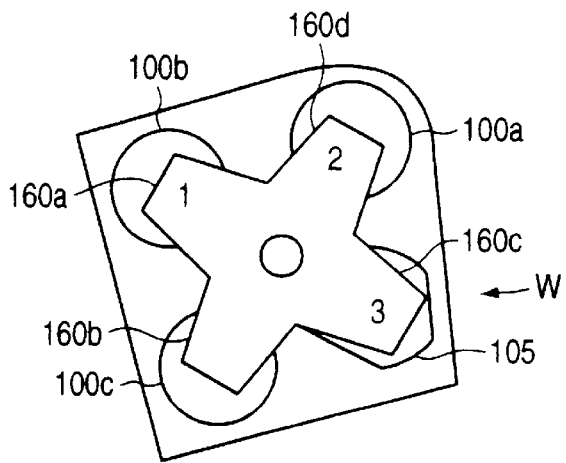
Figure 5D:
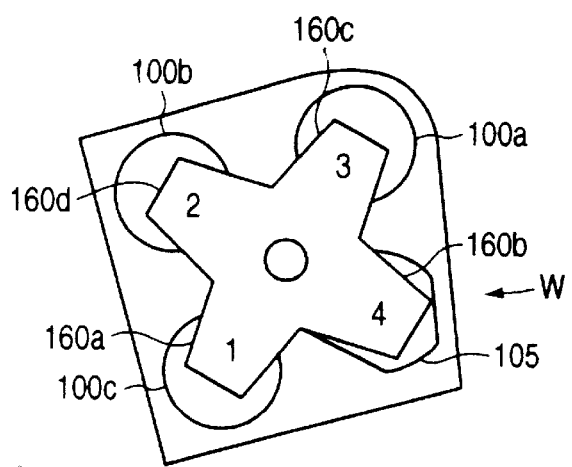
Figure 5E:
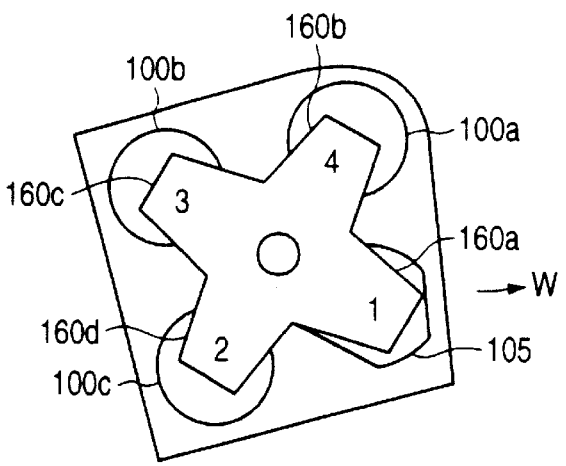
Figure 5F:
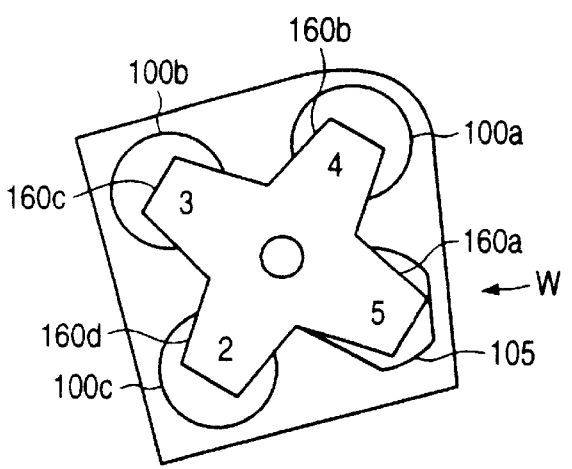

FIGS. 5A–5F show the carrousel 150 and its movement with respect to the insertion of a substrate such as a wafer (W) and subsequent movement of carrier head systems 160a–160d. As shown in FIG. 5A, a first wafer W#1 is loaded from loading apparatus 60 into transfer station 105, where the wafer is washed and then loaded into a carrier head 180, e.g., that of a first carrier head system 160a. Carousel 150 is then rotated counter-clockwise on supporting center post 152 so that, as shown in FIG. 5B, first carrier head system 160a with wafer W#1 is positioned at the first polishing station 10a, which performs a first polish of wafer W#1. While first polishing station 100a is polishing wafer W#1, a second wafer W#2 is loaded from loading apparatus 60 to transfer station 105 and from there to a second carrier head system 160b, now positioned over transfer station 105. Then carousel 150 is again rotated counter-clockwise by 90° so that, as shown in FIG. 5C, first wafer W#1 is positioned over second polishing station 100b and second wafer W#2 is positioned over first polishing station 10a. A third carrier head system 100c is positioned over transfer station 105, from which it receives a third wafer W#3 from loading system 60. In a preferred embodiment, during the stage shown in FIG. 5C, wafer W#1 at second polishing station 100b is polished with a slurry of finer grit than wafer W#1 at the first polishing station 100a. In the next stage, as illustrated by FIG. 5D, carousel 150 is again rotated counter-clockwise by 90° so as to position wafer W#1 over third polishing station 10c, wafer W#2 over second polishing station 100c, and wafer W#3 over first polishing station 10a, while a fourth carrier head system 160d receives a fourth wafer W#4 from loading apparatus 60. The polishing at third polishing station 100c is presumed to be even finer than that of second polishing station 10b. After the completion of this stage, carousel 150 is again rotated. However, rather than rotating it counter-clockwise by 90°, carousel 150 is rotated clockwise by 270°. By avoiding continuous rotation in one direction, carousel 150 may use simple flexible fluid and electrical connections rather than complex rotary couplings. The rotation, as shown in FIG. 5E, places wafer W#1 over transfer station 105, wafer W#2 over third polishing station 100c, wafer W#3 over second polishing station 100b, and wafer W#4 over first polishing station 10a. While wafers W#1–W#3 are being polished, wafer W#1 is washed at transfer station 105 and returned from carrier head system 160a to loading apparatus 60. Finally, as illustrated by FIG. 5F, a fifth wafer W#5 is loaded into first carrier head system 160a. After this stage, the process is repeated.

Figure 6:
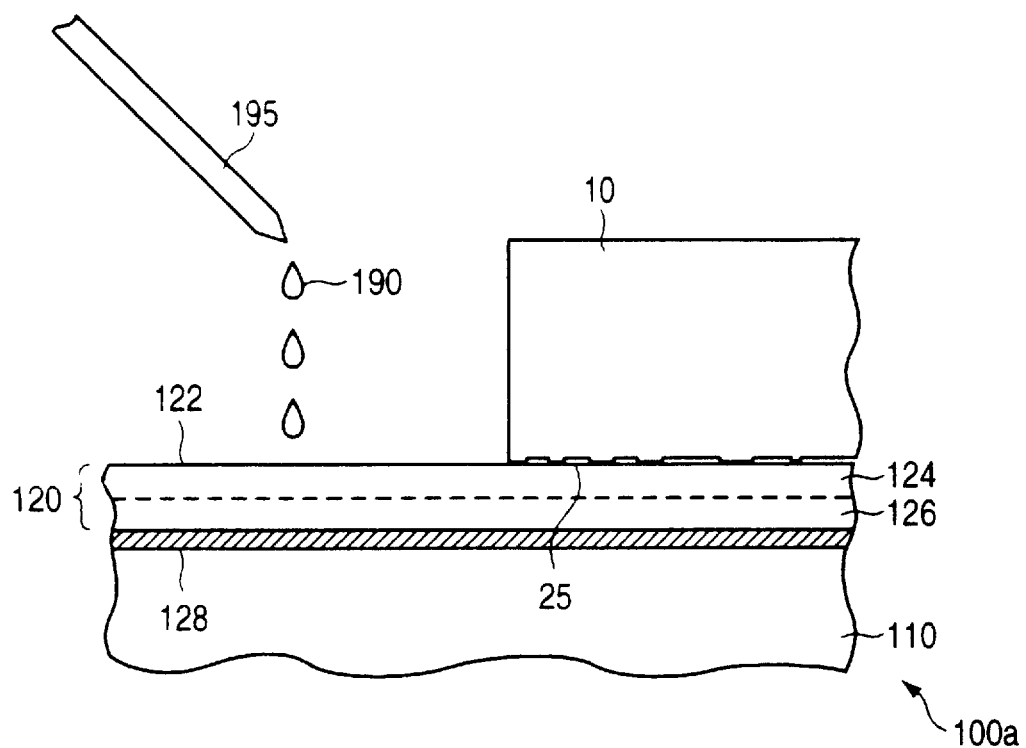
FIG. 6 is a schematic side view of a polishing pad.

As shown in FIG. 6, a carrier head system, such as system 160a, lowers substrate 10 to engage a polishing station, such as polishing station 10a. As noted, each polishing station includes a rigid platen 110 supporting a polishing pad 120. If substrate 10, is an eight-inch (200 mm) diameter disk, then platen 110 and polishing pad 120 will be about twenty inches in diameter. Platen 110 is preferably a rotatable aluminum or stainless steel plate connected by stainless steel platen drive shaft (not shown) to a platen drive motor (not shown). For most polishing processes, the drive motor rotates platen 120 at thirty to two-hundred revolutions per minute, although lower or higher rotational speeds may be used.

Polishing pad 120 is a hard composite material with a roughened surface 122. Polishing pad 120 may have a fifty mil thick hard upper layer 124 and a fifty mil thick softer lower layer 126. Upper layer 124 is preferably a material composed of polyurethane mixed with other fillers. Lower layer 126 is preferably a material composed of compressed felt fibers leached with urethane. A common two-layer polishing pad, with the upper layer composed of IC-1000 and the lower layer composed of SUBA-4, is available from Rodel, Inc., located in Newark, Del. (IC-1000 and SUBA-4 are product names of Rodel, Inc.). In one embodiment, polishing pad 120 is attached to platen 110 by a pressure-sensitive adhesive layer 128.

Each carrier head system includes a rotatable carrier head. The carrier head holds substrate 10 with the top surface 22 pressed face down against outer surface 122 of polishing pad 120. For the main polishing step, usually performed at station 100a, carrier head 180 applies a force of approximately four to ten pounds per square inch (psi) to substrate 10. At subsequent stations, carried head 180 may apply more or less force. For example, for a final polishing step, usually performed at station 10c, carrier head 180 applies about three psi. Carrier drive motor 186 (see FIG. 4) rotates carrier head 180 at about thirty to two-hundred revolutions per minute. In a preferred embodiment, platen 110 and carrier head 180 rotate at substantially the same rate.

A slurry 190 containing a reactive agent (e.g., deionized water for oxide polishing), abrasive particles (e.g., silicon dioxide for oxide polishing) and a chemically reactive catalyzer (e.g., potassium hydroxide for oxide polishing), is supplied to the surface of polishing pad 120 by a slurry supply tube 195. Sufficient slurry is provided to cover and wet the entire polishing pad 120.

Chemical mechanical polishing is a fairly complex process, and differs from simple wet sanding. In a polishing process the reactive agent in slurry 190 reacts with the surface 22 of top layer 20, which may be a conductive, semiconductive, or insulative layer, and with the abrasive particles to form reactive sites. The interaction of the polishing pad, abrasive particles, and reactive agent with the substrate results in polishing.

As mentioned above, the surface of polishing pad 120 becomes "glazed" during the chemical mechanical polishing process. This glazing is primarily caused by pressure and heat applied to the portion of the pad beneath the carrier head. The heat (about 70° C. for IC-1000) causes the polishing pad to loose its rigidity and flow so that, under pressure, the peaks flatten out and the depressions fill up. A glazed polishing pad has a lower coefficient of friction, and thus a substantially lower polishing rate, than a "fresh" or un-glazed pad. As the polishing rate drops, the time required to polish a substrate increases, and the throughput of substrates through the polishing apparatus falls. In addition, because the polishing pad becomes slightly more glazed after each successive polishing operation, each successive substrate may be polished to a slightly different extent. Therefore, the polishing pad must be periodically conditioned to provide a consistently rough pad surface.

Conditioning deforms the surface of the polishing pad so that it is no longer planar. The conditioning process physically abrades surface 122 of polishing pad 120 to restore its roughness (see FIG. 7). This abrasion "wears" the pad; i.e., it removes material from the surface of the polishing pad. The wear on the polishing pad is often non-uniform. This is because conditioning apparatus 130 (see FIG. 3) may remove more material from polishing pad 120 in some regions than in others.

The non-uniform thickness of the pad affects the substrate polishing rate. When surface 22 of substrate 10 (see FIG. 6) is pushed against surface 122 of polishing pad 120, the thinner areas of the polishing pad are compressed less, and therefore exert less pressure on substrate 10. Consequently, the thinner areas of the polishing pad will polish a substrate at a slower rate than the thicker areas. Therefore, the non-uniform thickness of a polishing pad may generate a non-uniform substrate outer layer.

An unused polishing pad usually has a flat surface. However, as shown schematically by FIG. 7, a used polishing pad 120 has a thickness "t" that varies across the diameter "d" of the polishing pad. A polishing pad typically wears more in a ring area 121 than at the center 123 or edge 125 of the polishing pad. The radius of ring 121 is about half the radius "R" of the polishing pad.

Conditioning apparatus 130 eventually wears away polishing pad 120 until it is too thin to effectively polish. However, the polishing pad is usually discarded, due to non-uniformities, long before it is worn away. A typical polishing pad has a lifetime of about three-hundred and fifty wafers, assuming the pad is conditioned after each wafer is processed.

Figure 7:
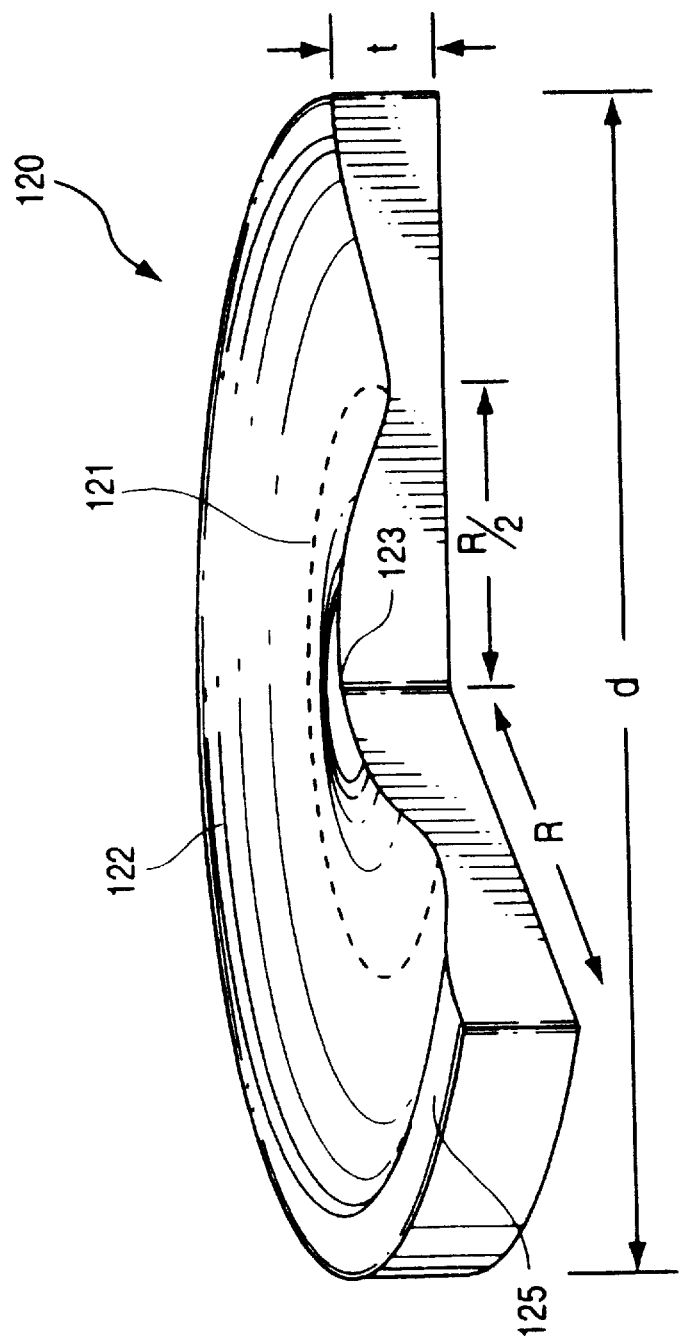
FIG. 7 is a schematic perspective view, with a partial cross section, of a worn polishing pad.

Because the polishing pad rotates, the conditioning and polishing processes tend to create a radially symmetric wear pattern, as shown in FIG. 7. Since the thickness of the pad is radially symmetric, the operator of a polishing apparatus may evaluate a conditioning process by measuring the pad profile, which is the pad thickness along a diameter. The operator can measure the pad profile after a number n, e.g., one to twenty, conditioning operations to determine which parts of the pad have degraded the most and whether the wear rate has changed. The operator can find the "best" conditioning process, i.e., the conditioning process that creates the least non-uniformity in pad thickness, by comparing the pad profiles of polishing pads subjected to different conditioning processes.

In addition, an operator can compensate for non-planarity or non-uniformity in the polishing pad by appropriately selecting polishing processing parameters, such as the pressure applied to the substrate, the polishing pad rotation rate, the substrate rotation rate, and the dwell time, which is the duration that a substrate remains at a specific pad location. For example, by selectively sweeping a substrate over both thick and thin regions of the pad, a substrate outer layer may be substantially evenly polished. Alternately, an operator always has the option of simply discarding the polishing pad if the variation in thickness across its surface 122 exceeds some predetermined value.

Figure 8:
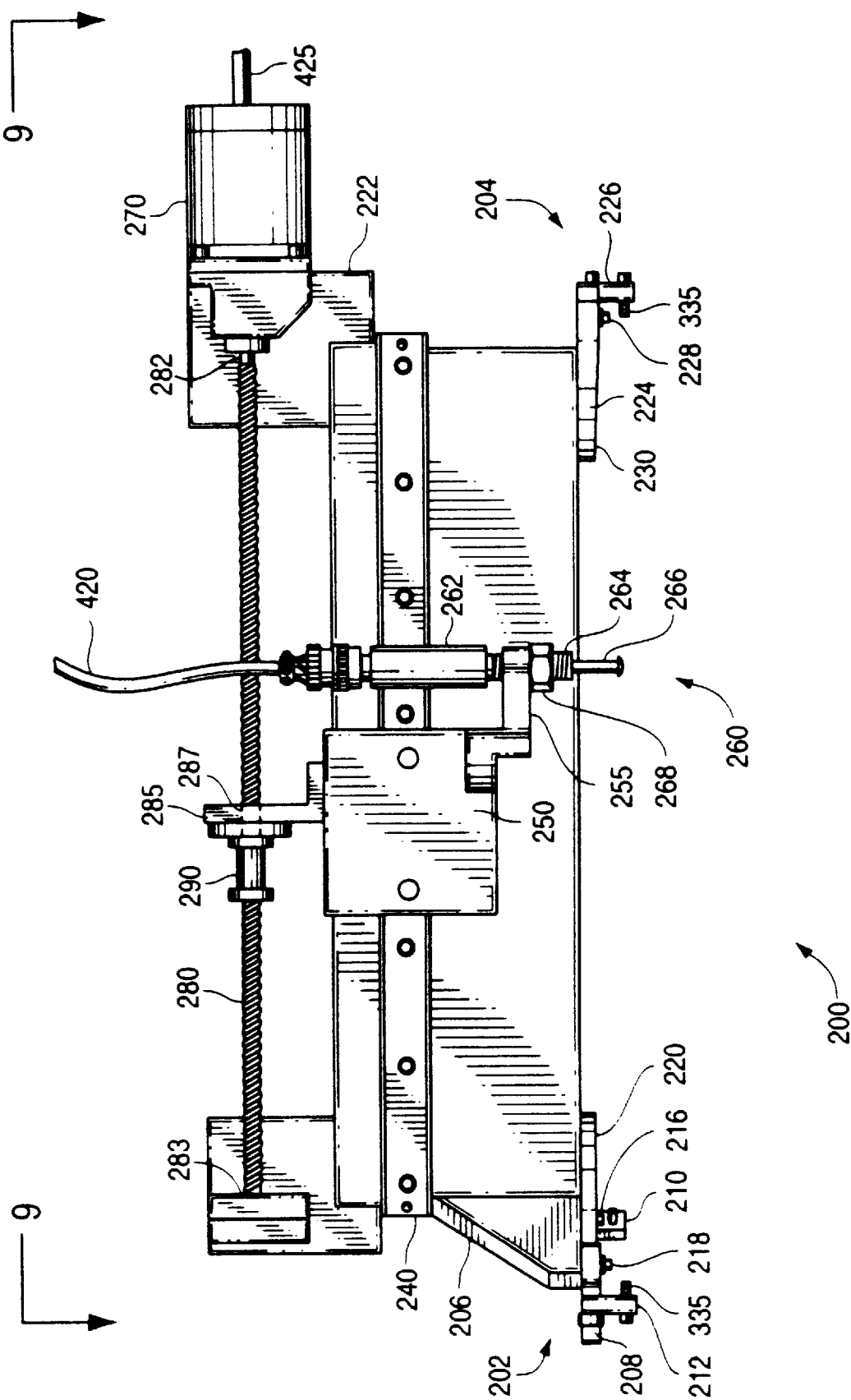
FIG. 8 is a schematic side view of a pad profiler in accordance with the present invention.

As shown in FIG. 8, a pad profiler 200 is used to measure the thickness "t" of polishing pad 120. As shown most clearly in FIG. 12 and as discussed below, when in use, pad profiler 200 is mounted on platen 110. When not in use, pad profiler 200 may be stored separately from chemical mechanical polishing system 50.

Pad profiler 200 has three mounting points or locations for engaging the platen. Each mounting point includes a foot which will rest on the platen to support the pad profiler thereon. Each mounting point also includes a downturned tab to catch on the rim of the platen to hold the pad profiler in place.

Pad profiler 200 includes a two-point mounting assembly 202 and a one-point mounting assembly 204 to provide a three-point mount vis-a-vis the platen. Two-point mounting assembly 202 has a support member 206 projecting upwardly from a base 208. Base 208 has downturned tabs 210 and 212 on its outer edge. Positioned inwardly of each downturned tabs are two mounting feet 216 and 218. The feet project downwardly from the underside 220 of base 208.

Similarly, one-point mounting assembly 204 has a support member 222 projecting upwardly from a base 224. Base 224 has a single downturned tab 226 at its outer edge. In front of downturned tab 226, a mounting foot 228 projects downwardly from the underside 230 of base 224. The underside 220 of base 208 and the underside 230 of base 224 rest in a common plane which will be substantially parallel to surface 122 of polishing pad 120.

Members 206 and 222 rigidly support a single-axis guide 240 above bases 208 and 224. Guide 240 is somewhat longer than the diameter of the platen. For a twenty-two inch diameter platen, for example, the guide may be about twenty-four inches long, and it may be supported about one inch above the bases. Guide 240 supports a slide assembly 250. The slide assembly can move horizontally along a longitudinal axis of the guide. A position sensor 260 is connected to an arm 255 which projects from slide assembly 250 (see also FIG. 13). In operation, sensor 260 determines the height of surface 122 of polishing pad 120.

In one embodiment, sensor 260 is a linear variable differential transformer (LVDT). Sensor 260 includes a housing 262 for electronics, a threaded tube 264, and a sensing arm 266. Sensing arm 266 can slide up and down in housing 262. Sensing arm 266, in use, rests on the surface of the polishing pad. Sensor 260 detects the vertical position of sensing arm 266 and converts that information into a voltage signal. Sensor 260 can measure the vertical position of sensing arm 266 with a precision of about 0.1 microns. Threaded tube 264 screws into a threaded hole in arm 255 to hold sensor 260 in place. A nut 268 at the underside of arm 255 may secure sensor 260 to the arm. In another embodiment, sensor 260 may be a laser analog position sensing device, such as Aromat or Keyence Laser.

Support member 222 of one-point mount 204 also supports a rotary motor 270. Preferably, rotary motor 270 is a stepper motor, but it could also be a DC motor with an encoder feedback. Rotary motor 270 spins a long lead screw 280 in discrete steps. One end 282 of lead screw 280 is supported by rotary motor 270, and the opposite end 283 is supported by a rotary connection to support member 206.

A flange 285 with a lateral passage 287 projects from slide assembly 250. Lead screw 280 passes through passage 287 and engages a threaded tube 290 which is mounted to flange 285 in passage 287 (see also FIG. 13). If lead screw 280 has approximately four threads per inch, and each step of motor 270 turns screw 280 by about $5 \times 100^{-5}$ of a revolution, then each step by the motor can move slide assembly 250 about $1.25 \times 10^{-5}$ inches.

Figure 9:
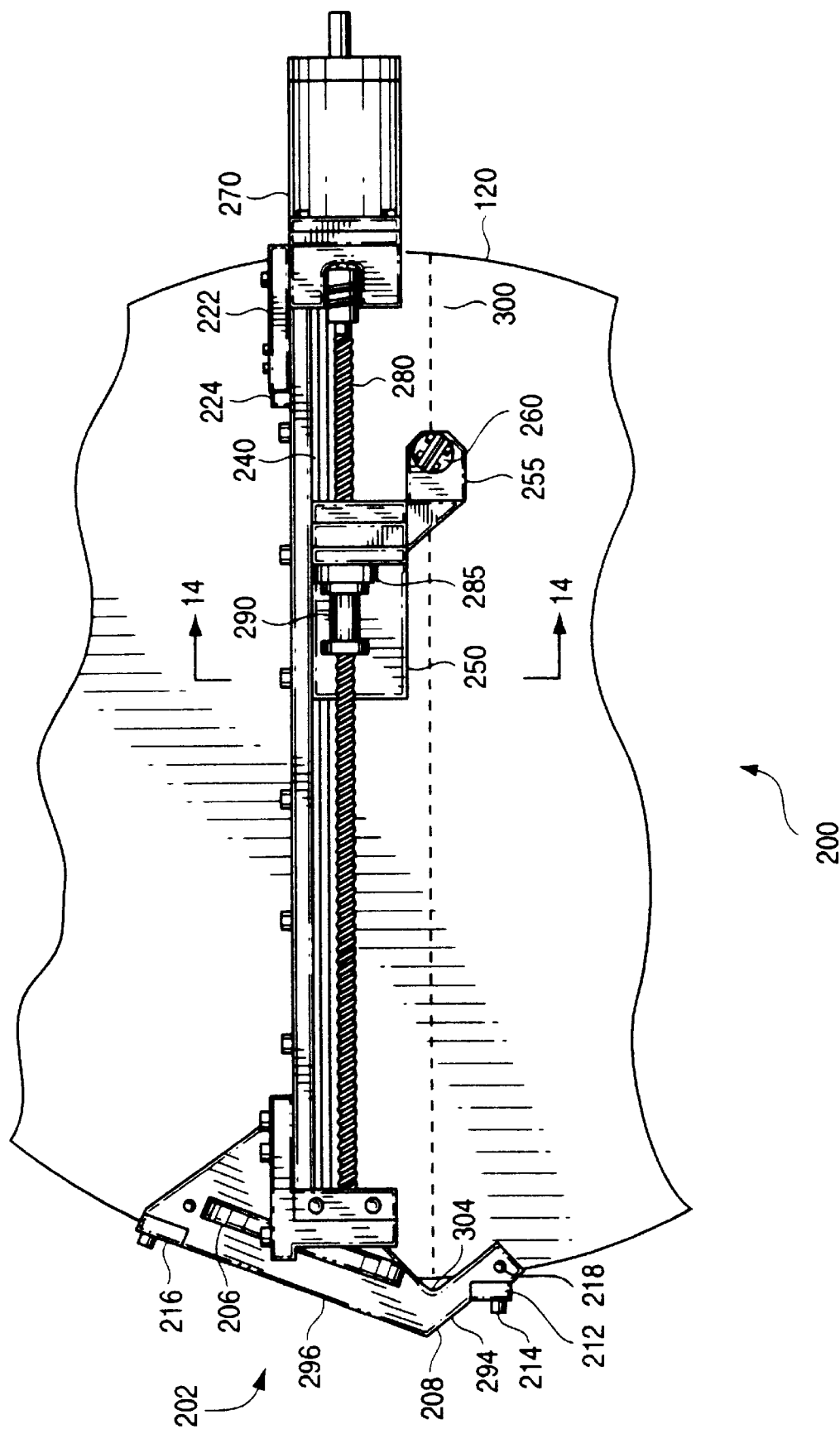
FIG. 9 is a view along line 9—9 of FIG. 8.

Referring to FIG. 9, the configuration of pad profiler 200 permits an even distribution of its weight to the three mounting feet 216, 218 and 228, ensuring a stable platen mounting arrangement. Base 224 and foot 228 are hidden underneath motor 270 in FIG. 9, but can be seen in FIG. 12. Base 224 is generally triangular in shape (see FIG. 12). Base 208 is generally "L-shaped", with a narrow arm 294 and a flaring arm 296. Downturned tabs 210 and 212 are positioned at the outer corners of L-shaped base 208. Downturned tab 226 is located at the inner corner of base 224. Most of the weight of rotary motor 270 bears directly on mounting foot 228 through support member 222.

When attached to a polishing pad, guide 240 and lead screw 280 run parallel to a diametric segment 300 that passes through the center of polishing pad 120. Arm 255 projects outwardly from slide assembly 250 so that sensor 260 is located over segment 300. Thus, when motor 270 turns lead screw 280, slide assembly 250 moves along guide 240 and sensor 260 travels along diametric segment 300.

Figure 13:
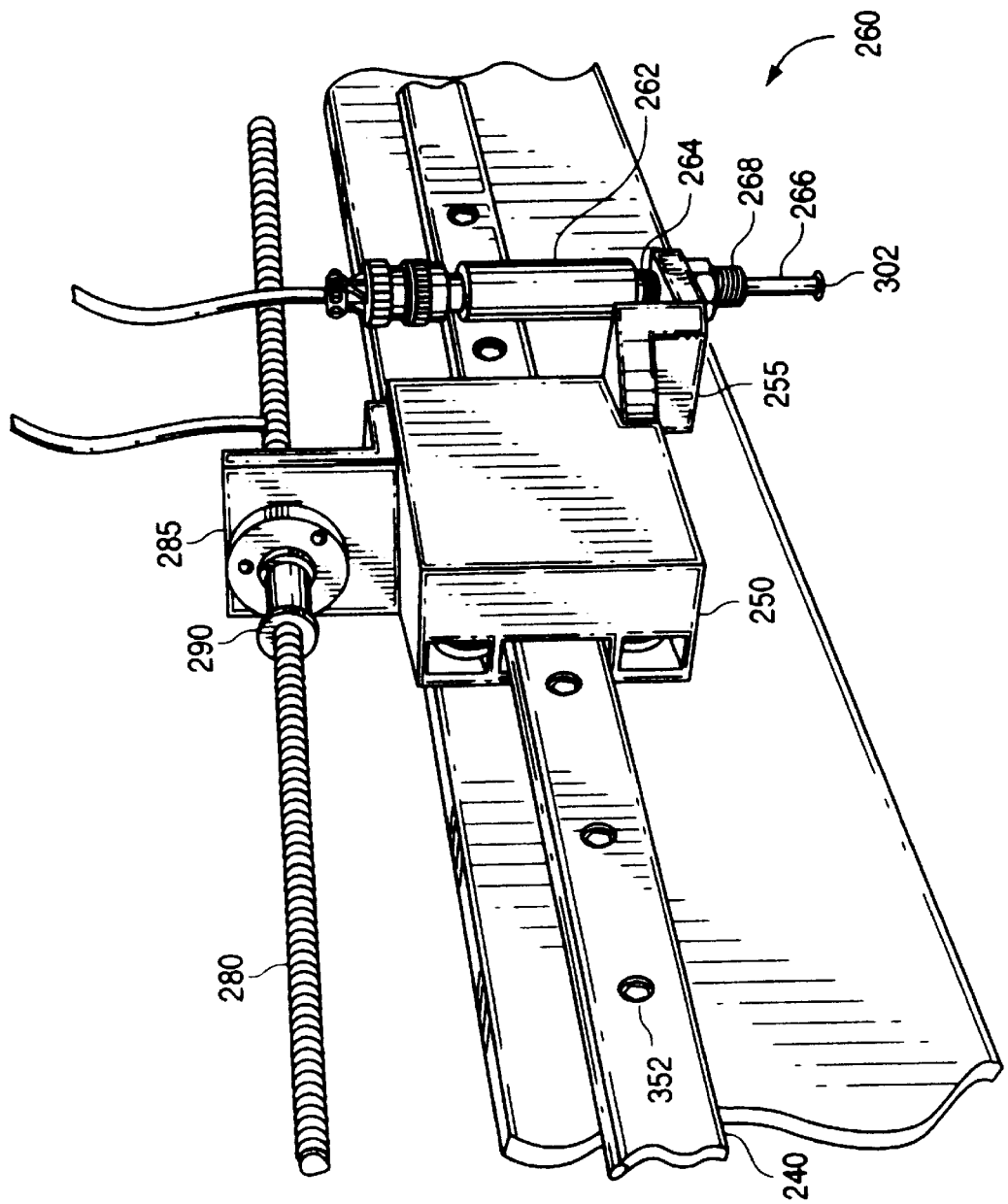
FIG. 13 is a schematic perspective view of a slide mounted on a guide of the pad profiler of the present invention.

Turning to FIG. 13, a rounded head 302 at the bottom of sensing arm 266 rests on surface 122 of polishing pad 120. As the height sensor 260 moves along diametric segment 300, rounded head 302 travels up and down the contours of polishing pad surface 122. Sensor 260 measures the displacement of sensing arm 266 along segment 300 and generates a pad profile along this segment.

Returning again to FIG. 9, a crook 304 in L-shaped base 202 aligns with diametric segment 300 and is sufficiently recessed so that pad profiler 200 does not obstruct sensor 260 from measuring the end of segment 300 at the edge of the polishing pad. However, in order to perform this measurement, arm 255 would have to projected in the opposite direction from that shown.

Figure 10:
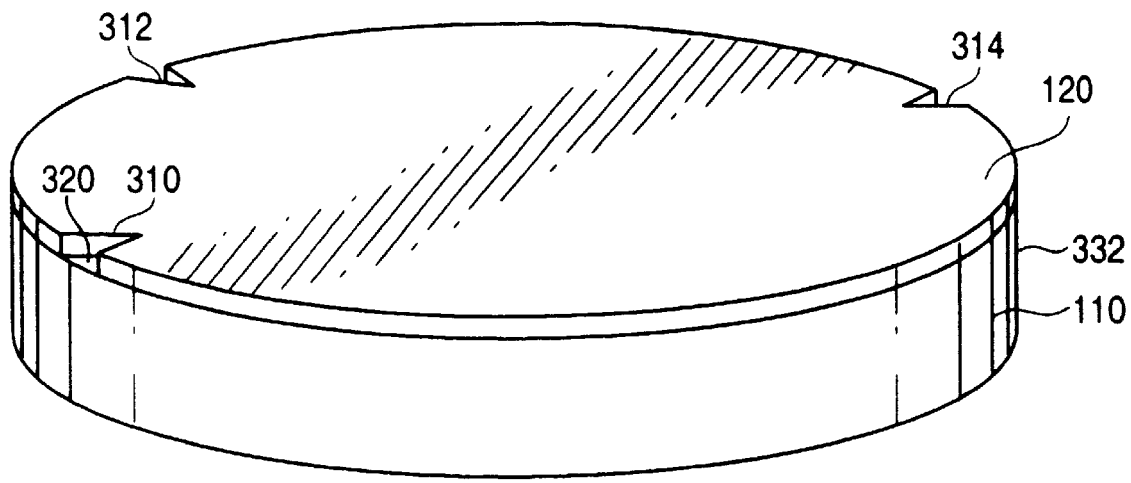
FIG. 10 is a schematic perspective view of a polishing pad on a platen.

As shown in FIG. 10, polishing pad 120 rests on platen 110. Three notches 310, 312 and 314 are formed in polishing pad 120, exposing the top surface 320 of the platen. Notches 310, 312 and 314 are positioned to correspond to the position of the three mounting feet 216, 218 and 228 of the pad profiler. The notches may be triangular, square, semicircular, or any other appropriate shape, so long as they permit the mounting feet to rest on top surface 320 of platen 110 rather than surface 122 of polishing pad 120.

Figure 11:
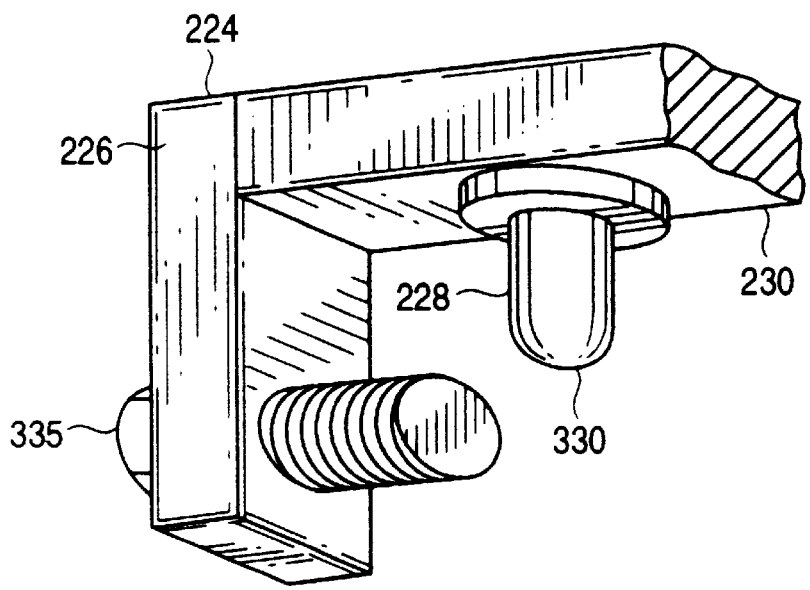
FIG. 11 is a schematic perspective view of a mounting point of the pad profiler of the present invention.

Mounting assemblies 202, 204 have a somewhat similar construction. Mounting assembly 202, as discussed above, has two mounting feet 216, 218 and two associate tabs 210, 212, whereas mounting assembly 204 has one mounting foot 228 and associate tab 226. As shown in FIG. 11, foot 228 projects downwardly from surface 230 of base 224. Preferably, foot 228 ends in rounded tip 330 to ensure proper contact with the surface 320 of the platen, but tip 330 could be flat. Downturned tab 226, which is tangent to the circular outer rim 332 of platen 110 (see FIGS. 9 and 10), projects from the outer edge of base 224. A screw 335 extends through downturned tab 226. Screws also extend through downturned tabs 210 and 212.

Figure 12:
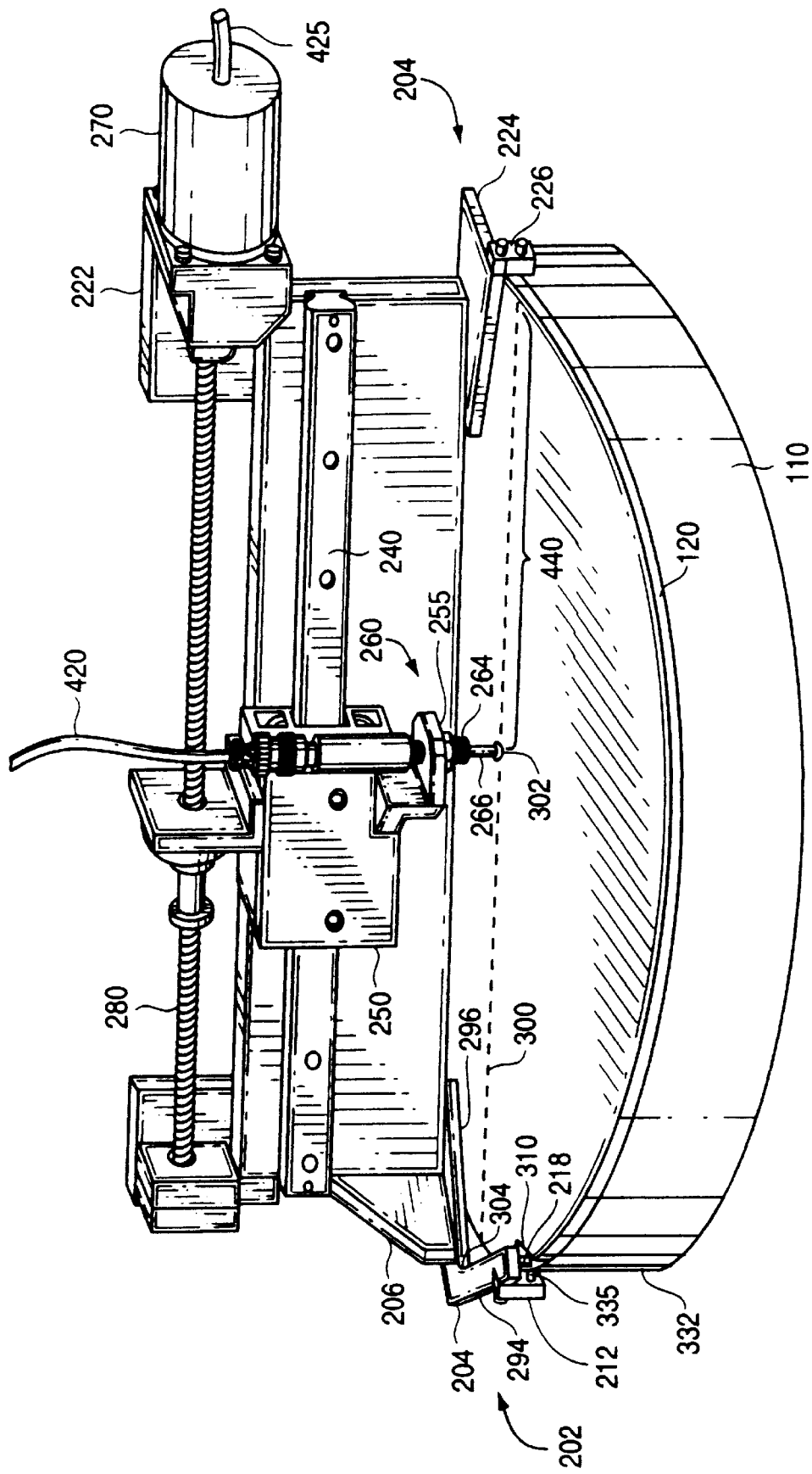
FIG. 12 is a schematic perspective view of the pad profiler of the present invention mounted on a polishing pad.

Referring to FIG. 12, pad profiler 200 is positioned so that feet 216, 218 and 228 fit into notches 310, 312 and 314, respectively, to rest on top surface 320 of platen 110. Then, each of the three screws 335 on tabs 210, 212 and 226 are tightened to engage platen rim 332 to hold pad profiler 200 firmly in place.

Figure 14:
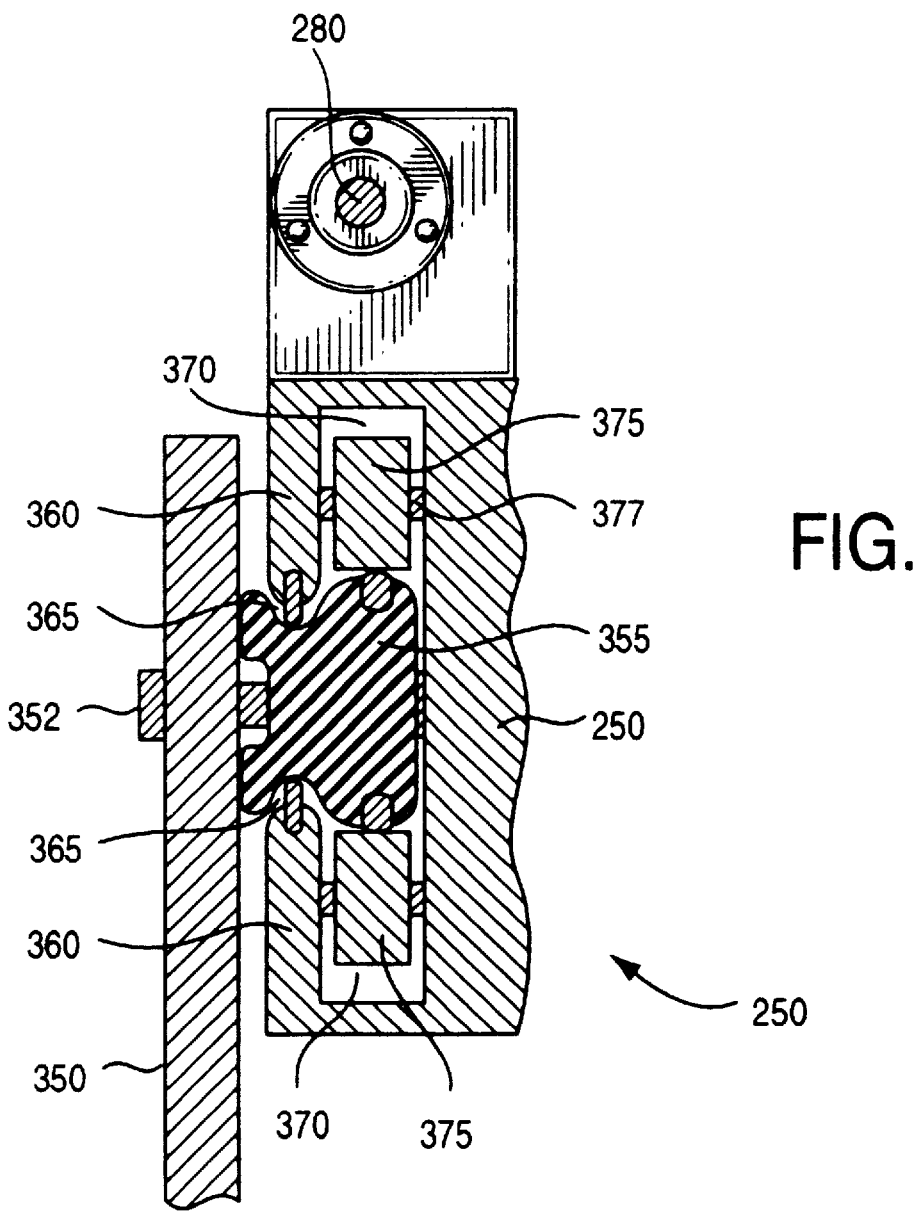
FIG. 14 is a view along line 14—14 of FIG. 9.

As shown in FIG. 14, in one embodiment, guide 240 includes a T-shaped projection 355 which is connected to a base 350 by bolts 352. Sliding assembly 250 has a housing with sides or members 360 that project into gaps 365 formed by base 350 and T-shaped projection 355. The sides or members 360 of sliding assembly 250 form a void space 370 within which one or more wheels 375 are supported, for example, by an axle 376. Wheels 375 ride on the edges of T-shaped projection so that sliding assembly 250 can easily move along guide 240. The wheels and T-shaped projection may be made of a low-friction material, or they may be lubricated.

Figure 15:
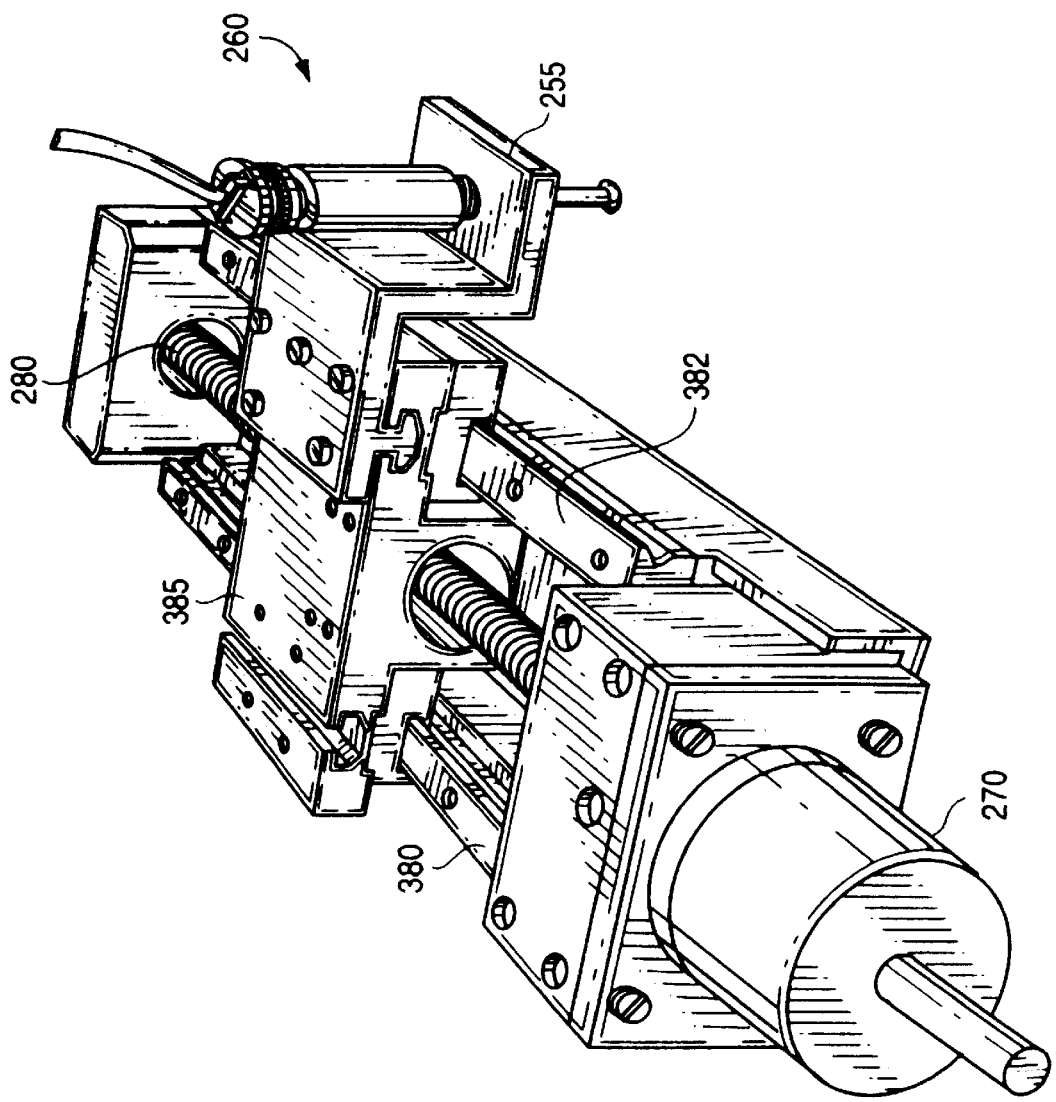
FIG. 15 is a schematic perspective view of a pad profiler in accordance with the present invention using a dual-slide system.

In an alternate embodiment, shown in FIG. 15, pad profiler 200 uses a dual guide system. Lead screw 280 rides between a first guide 380 and a second guide 382. A dual slide assembly 385 grasps both guides 380 and 382. Preferrably, dual guides 380 and 382 are supported by mounting assemblies 202 and 204 in a plane perpendicular to the surface of the polishing pad. Sensor 260 is connected to dual slide assembly 385 by arm 255. A dual guide system is available from Tomson, Inc.

Figure 16:
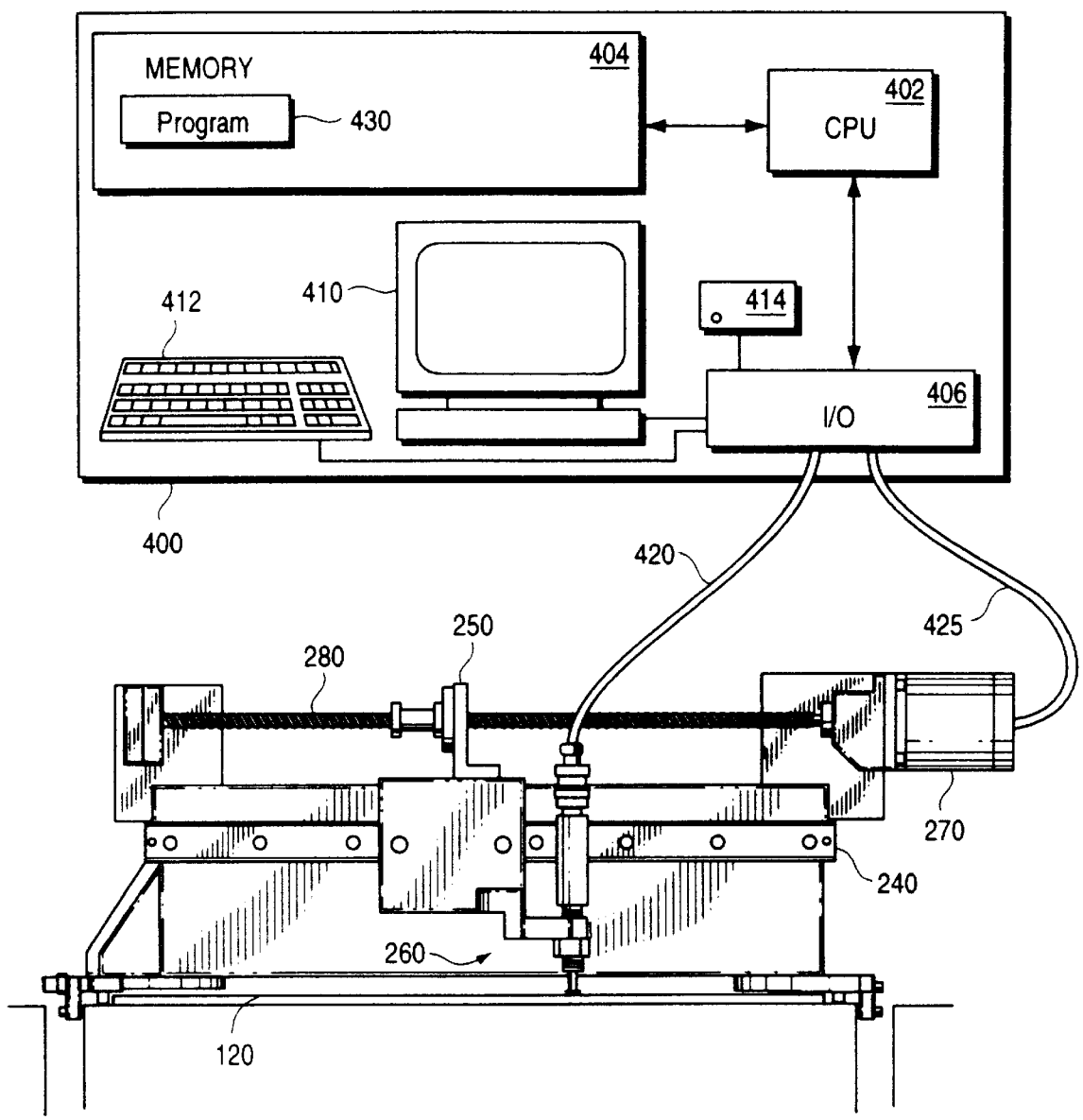
FIG. 16 is a schematic block diagram of a computer control system for the pad profiler of the present invention.

As shown in FIG. 16, pad profiler 200 is connected to a computer control system 400. Preferably, the computer control system includes a central processing unit (CPU) 402, a memory 404 and an input/output port (I/O) 406. In addition, control system 400 has a display 410, such as a CRT, a user input device 412, such as a keyboard, and a non-volatile storage 414, such as a hard disk. I/O port 406 connects control system 400 to an input signal line 420 from sensor 260 and to an output signal line 425 to rotary motor 270. Control system 400 runs a pad profiling program 430 from memory 404. Pad profiling program 430 has two primary functions: it controls rotary motor 270 via output signal line 425 in order to move sensor 260 along diametric segment 300, and it converts signals from input signal line 420 to a digital position signal and stores that data on disk 414.

Pad profiling program 430 may run an extremely simple process. For example, program 430 can begin by loading the start and end points of the path that sensor 260 will travel. Program 430 instructs motor 270 to move sensor 260 to the start point. Then program 430 enters a loop: it increments a counter, instructs motor 270 to rotate by one step to advance the sensor, takes a measurement from the sensor, and stores the measurement and the value of the counter on disk 414. Program 400 repeats the loop until sensor 260 reaches the end point.

Sensor 260 does not directly measure the thickness of polishing pad 120 but rather the position of head 302. In order to generate a thickness measurement, the polishing apparatus compares the position of the head with and without the polishing pad.

In order to generate a pad profile, pad profiler 200 scans across a radius, such as a radial segment 440 (see FIG. 12), of the top surface of the fresh polishing pad. As it is assumed that the wear pattern of the polishing pad is radially symetric, measurements taken along radial segment 440 are assumed to represent the pad profile around the entire polishing pad. The scan results are saved as a baseline file in memory 404 and/or disk 414. After a number n of polishing opperations, the pad profiler 200 scans the worn polishing pad and saves the results as a measurement file. Because the difference between the position measurements of the fresh and worn pad is the change in pad thickness, the computer system 400 subtracts the baseline scan from the measurement scan to produce the pad wear profile. Pad profiler 200 may perform subsequent measurement scans after a predetermined number of polishing and conditioning processes to create a series of measurement scans. In such a case, computer system 400 subtracts the original baseline scan from each measurement scan to generate a series of pad profiles. The series of pad profiles may be displayed to show the dynamic wear of a polishing pad.

Figure 17A:
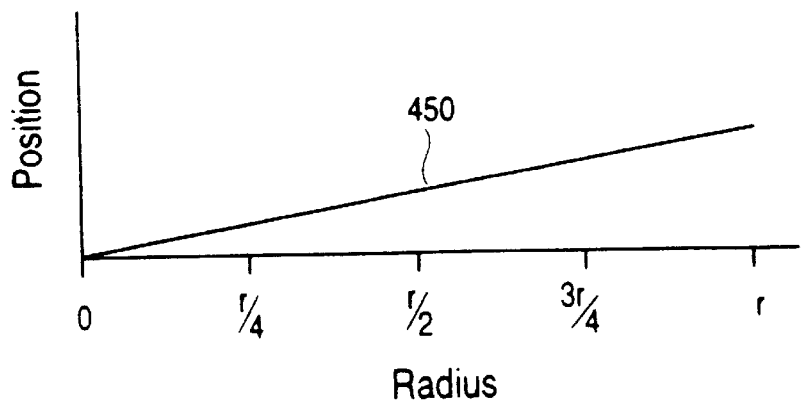
FIGS. 17A–17C are schematic graphs illustrating pad profile measurements.
Figure 17B:
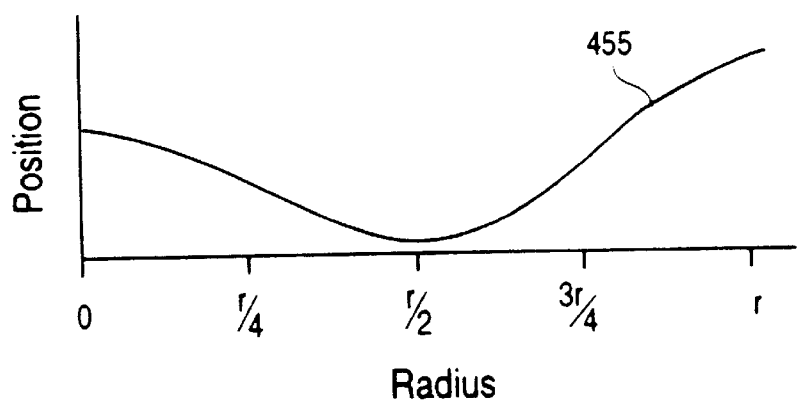
Figure 17C:
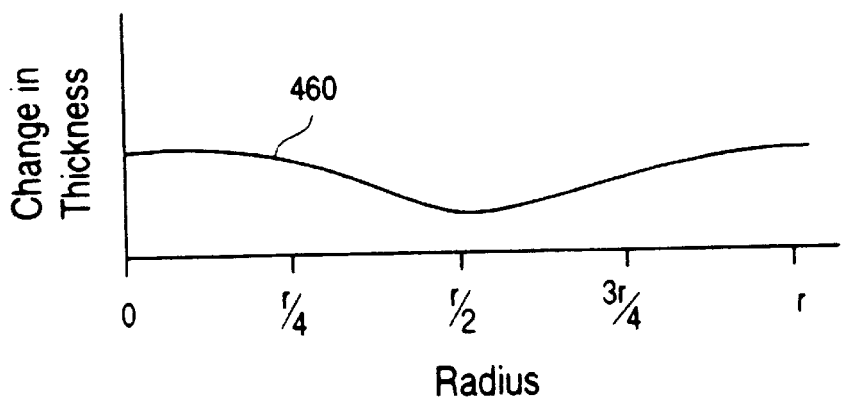

Examples of a baseline scan and a measurement scan and a resulting pad profile are illustrated in FIGS. 17A–17B, in which position along radial segment 440 is on the x-axis and the sensor measurement of head 302 is on the y-axis. An example of a resulting pad profile is illustrated in FIG. 17C, in which position along radial segment 440 is on the x-axis and the change in pad thickness is on the y-axis. As shown in FIG. 17A, if slide 240 is not exactly parallel to the surface of fresh polishing pad 120, then as sensor 260 moves across the pad, it will generate a linear sloped response 450. As shown in FIG. 17B, if a used polishing pad is on the platen, sensor 260 will generate a non-linear response 455. To determine the thickness of the pad as a function of distance along radial segment 440, response 450 is subtracted from response 455 to create pad profile 460. In this example, pad profile 460 shows that polishing pad 120 is thinnest in a ring located at about half the radius of the polishing pad (see FIG. 7).

In other arrangements, pad profiler 200 may be permanently secured to polishing apparatus 80 of the chemical mechanical polishing system 50. In one such arrangement, a guide is mounted on an arm which is attached to the table top by a rotatable base. In another arrangement, a guide is mounted to the bottom surface of support plate 156. A sensor may be mounted on a sliding assembly which is supported by the guide. The sliding assembly can move horizontally along the guide to measure the profile of polishing pad 120.

In summary, the pad profiler of the present invention has a three-point mount support the profiler above a polishing pad. A slider assembly is supported on a guide, and a sensor is connected to the slider assembly and positioned over a diametric segment of the polishing pad. The profiler uses a lead screw to drive the slider assembly across the polishing pad. The advantages of the invention include the measurement of the thickness of polishing pad to optimize polishing process parameters or to select a conditioning process. Additional advantages include stable support of the profiler over the pad, and smooth motion of the sensor along a diameter of the pad.

The present invention has been described in terms of a preferred embodiment. The invention, however, is not limited to the embodiment depicted and described. Rather, the scope of the invention is defined by the appended claims.

What is claimed is:

1. An apparatus for measuring a thickness of a polishing pad in a chemical mechanical polishing system, comprising:
   a guide which can be aligned substantially parallel with a surface of a platen that supports said polishing pad;
   at least one mount for supporting said guide;
   a slide assembly supported on said guide; and
   a sensor connected to said slide assembly to be positioned over a radial segment of said polishing pad to measure the thickness as a function of said radial segment.

2. The apparatus of claim 1 wherein said sensor comprises a linear variable differential transformer.

3. The apparatus of claim 1 wherein said at least one mount includes three feet for resting on said platen.

4. The apparatus of claim 1 further comprising a lead screw positioned parallel to said guide, said lead screw connected to and rotated by a motor and extending through a threaded passage in said slide assembly.

5. The apparatus of claim 1, wherein the guide is longer than the diameter of the platen.

6. The apparatus of claim 2, wherein the sensor further comprises a sensing arm connected to the sensor to engage a surface of the polishing pad.

7. The apparatus of claim 1 further comprising a computer control system coupled to the sensor for receiving position data from the sensor.

8. The apparatus of claim 7 wherein the computer control system includes a pad profiling program.

9. A method for measuring a thickness of a polishing pad in a chemical mechanical polishing system, comprising:

providing an apparatus having a guide, at least one mount supporting the guide, a slide assembly supported on the guide, and a sensor connected to the slide assembly;

positioning the sensor over the polishing pad with the guide substantially parallel to a surface of a platen that supports the polishing pad;

moving the sensor along a radial segment of the polishing pad; and measuring the thickness of the polishing pad as of a function of the radial segment.

10. The method of claim 9 wherein the at least one mount includes three feet and the positioning step comprises positioning the three feet on the platen.

11. The method of claim 9 wherein the moving step comprises rotating a lead screw positioned parallel to the guide with a motor, the lead screw being connected to and extending through a threaded passage in the slide assembly.

12. The method of claim 9 wherein the measuring step comprises operating a computer control system to execute a pad profiling program.

13. The method of claim 9 further comprising adjusting a polishing parameter of the chemical mechanical polishing system based on the measured thickness.

14. A method for measuring a thickness of a polishing pad in a chemical mechanical polishing system, comprising:

positioning a sensor over the polishing pad;

moving the sensor along a radial segment of the polishing pad;

determining the thickness of the polishing pad along the radial segment; and establishing a pad wear profile of the polishing pad from the determined thickness.

15. The method of claim 14 further comprising adjusting a polishing parameter of the chemical mechanical polishing system based on the determined thickness.

16. The method of claim 14, wherein the measuring step comprises operating a computer control system to execute a pad profiling program.

17. An apparatus for measuring a thickness of a polishing pad in a chemical mechanical polishing system, comprising:

a sensor positioned over the polishing pad;

a motor electrically coupled to the sensor to move the sensor along a radial segment of the polishing pad to determine the thickness of the polishing pad along the radial segment; and a computer control system in communication with the motor and the sensor to cause the motor to move the sensor along the radial segment and to receive data from the sensor.

18. The apparatus of claim 17, wherein the sensor comprises a linear variable differential transformer.

19. The apparatus of claim 17, wherein the sensor includes a sensing arm to engage a surface of the polishing pad.

20. The apparatus of claim 17, wherein said data comprises thickness measurements and position data for adjusting a polishing parameter based upon the thickness measurements and the position data.

21. The apparatus of claim 17, wherein the computer control system includes a pad profiling program which operates on the position data and the thickness measurements.

* * * * *